Figure 1:
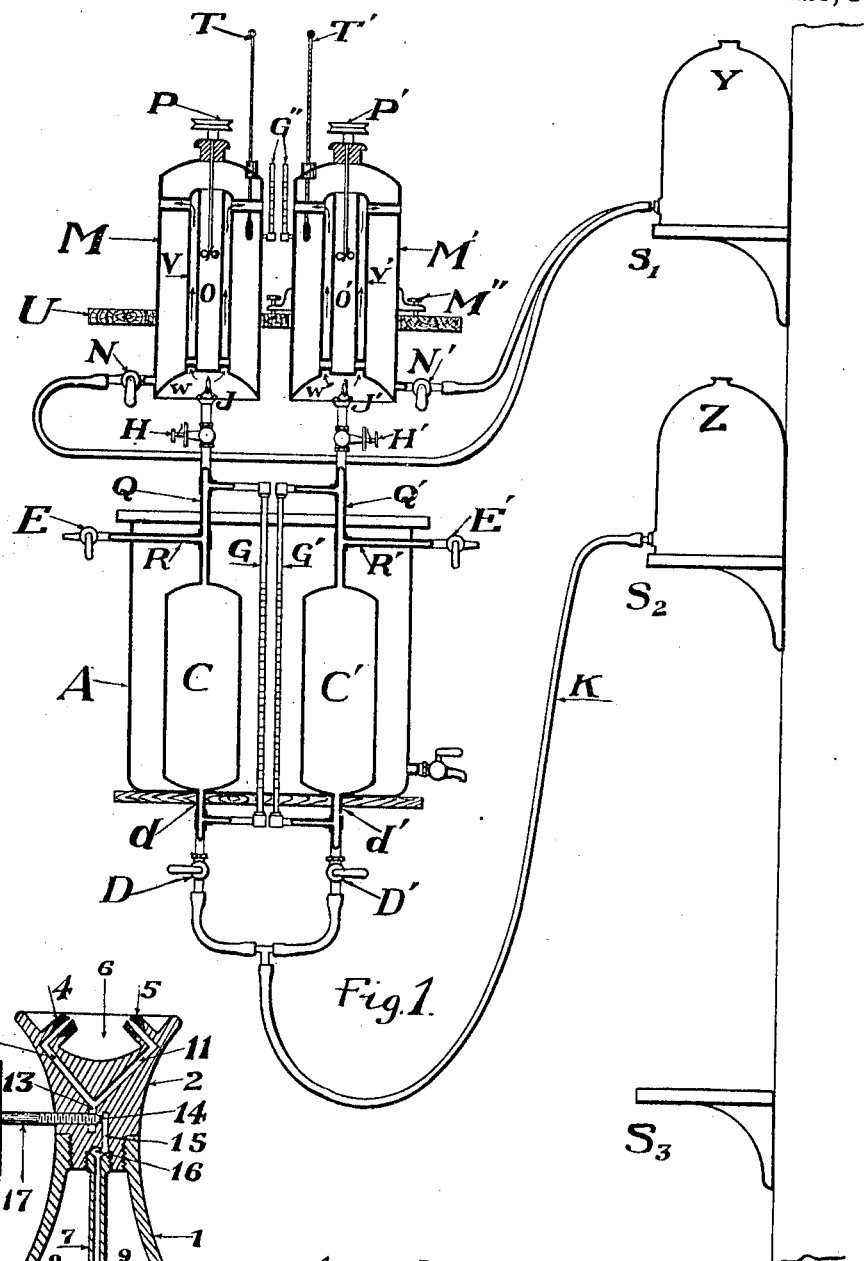

S. W. PARR.
CALORIMETER.
APPLICATION FILED MAR. 31, 1908.

947,418.

Patented Jan. 25, 1910.

WITNESSES:

INVENTOR
Samuel W. Parr
BY
James Hamilton
ATTORNEY

UNITED STATES PATENT OFFICE.

SAMUEL W. PARR, OF URBANA, ILLINOIS.

CALORIMETER.

947,418.  Specification of Letters Patent.  Patented Jan. 25, 1910.

Application filed March 31, 1908. Serial No. 424,371.

*To all whom it may concern:*

Be it known that I, SAMUEL W. PARR, a citizen of the United States, residing at Urbana, in the county of Champaign and State of Illinois, have invented certain new and useful Improvements in Calorimeters, of which the following is a specification, reference being had to the accompanying drawings.

My invention relates to improvements in calorimeters; and an object of my invention is to provide a calorimeter by means of which the calorific or heat value of the substance under test may be determined in terms of the calorific value of a standard substance, the absolute calorific value of the latter in heat units being known. The standard gas and the gas under test are burned under identical conditions of pressure, volume and temperature and the heat produced by the combustion of each is imparted to equal quantities of water subjected to the same external conditions as to radiation and the initial temperature of which is the same. If the rise in temperature due to the burning of the gas under test be represented by $t$, the rise in temperature due to the burning of an equal volume of the standard gas, as hydrogen, acetylene, methane or the like, be represented by $t'$ and the heat value of the standard gas per cubic foot be represented by $h'$, then the heat value per cubic foot of gas under test will be $$\frac{t\,h'}{t'}.$$

The quantity $h'$ will be obtained from any standard work giving calorific values and the quantities $t$, $t'$ will be obtained by observing the readings of the thermometers with which my new calorimeter is fitted or equipped.

Another method of obtaining the heat value of a substance by means of my new calorimeter is to maintain equal volumes of water at the same temperature. In this case the volumes of the standard gas and the gas under test would vary; and these volumes would be inversely proportional to the heat values of the two substances. Thus, if the volume of the standard gas required to maintain a given temperature in a given volume of water be represented by $v'$, the volume of the gas under test required to maintain the same temperature in an equal volume of water be represented by $v$ and the heat value of the standard gas be taken as before to be $h'$, then the heat value $h$ of the gas under test will be given by $$\frac{v'\,h'}{v}.$$

The substances may be in a liquid state, in which case absolute alcohol, amyl acetate or like substances may be used as the standard liquid; and if $w'$ represents the weight of the latter required to maintain a given volume of water at a given temperature and $w$ represents the weight of the liquid under test required to maintain an equal volume of water at the same temperature, then the heat value of the liquid under test will be given by $$\frac{w'\,h''}{w},$$

in which $h''$ represents the heat value of the standard liquid.

Figure 3:
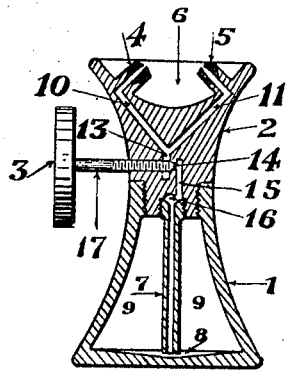
Figure 2:
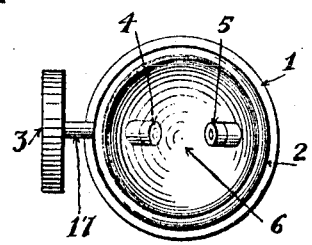

In the drawings illustrating the principle of my invention and the best mode now known to me of applying that principle, Figure 1 represents diagrammatically my new calorimeter in sectional elevation and Figs. 2 and 3 show in plan and in sectional elevation, respectively, a modified form of burner adapted for use in determining the heat value of a volatile liquid.

In the water tank A are submerged two identical volumeters or gas-receivers C, C', with which communicate at their lower ends the pipes $d$, $d'$, the flow through which is regulated by the valves D, D', respectively. Connected with both pipes $d$, $d'$, is one end of a hose K, the other end of which is connected to the pressure bottle Z. The upper ends of the volumeters or reservoirs C, C' communicate with the gas pipes Q, Q', from which extend laterally to the outside of the tank the charging pipes R, R' in the outer ends of which are mounted the valves E, E', respectively. The gage-glass G, communicates with the pipes $d$, Q, while the gage-glass G' communicates similarly with pipes $d'$, Q'. The uper ends of the gas pipes Q, Q' are provided with the regulating valves H, H', respectively.

In the shelf support U are fitted two water-heaters M, M', both of which are jacketed with felt and connected, as by the pipes N, N' respectively, with the filling or leveling bottle Y. The interiors of the water heaters M, M' are fitted with systems of pipes or flues V, V', respectively, for the passage of the products of combustion. The water heaters are further provided with thermometers T, T' and with agitators P, P' driven by any suitable device, (not shown). The water heater M' is provided with leveling screws M'', by means of which any slight discrepancy in size or dimensions between the two water-heaters M, M', may be compensated for by raising or lowering the water-heater M'.

In using the apparatus, the water-tank A is filled with water; and since the volumeters C, C' are submerged in this water-tank, the contents of the volumeters will be maintained at the same temperature. By raising the gravity or pressure bottle Z from the shelf $S_3$ to the shelf $S_2$, water will flow from the bottle Z into the volumeters C, C'. The volumeter C' is charged, through the charging pipe R', with hydrogen, methane, acetylene or other standard gas the heat value of which has been accurately determined and can easily be found by reference to standard works. Similarly the volumeter C is charged through the pipe R with the gas which is to be tested. By a proper manipulation of the valves E, E', the water level in the gage-glasses G, G' may be brought to the same level. The gas in the volumeters C, C' will then be under exactly the same conditions as to temperature, pressure and volume. The filling bottle Y, containing water, is placed upon a shelf $S_1$, and water flows from the bottle into the water spaces o, o' of the water heaters, M, M'. The leveling bottle Y may be lowered so that the water will drain from the water-spaces o, o' and mix in the water bottle, whereby it is insured that the initial temperature of the water in both water heaters M, M' is the same. Upon raising the bottle again, the water will, of course, rise to the same level in both water heaters; and any slight discrepancy there may be in the dimensions of the two heaters will be compensated for by raising or lowering the water-heater M' by means of the leveling screw M''. In order that the water may be kept constantly circulating, the agitators P, P', are driven during the test. The valves H, H' are opened and the gases are ignited. The flames of the gas jets J, J' heat the bottoms W, W' of the water-heaters M, M', respectively, and the products of combustion flow from the jet J through the system of flues V and from the jet J' through the system of flues V', whereby the water in the water-heaters M, M' is heated. By suitably manipulating the valves H, H', the water level in the gage-glasses G, G' will be kept even and the gases in the two volumeters will be exhausted therefrom at the same time. At this moment the reading of the thermometers T, T', is taken and the rise in temperature in each water-heater M, M', is noted. Assuming that the rise in temperature due to the burning of the gas under test from the volumeter C is represented by $t$, the increase in temperature due to the burning of the gas in the volumeter C' is represented by $t'$ and the heat value of the standard gas is taken as $h'$, the heat value $h$ of the gas under test will be given by $$\frac{t\,h'}{t'}.$$

Another method of using my calorimeter consists in so manipulating the valves H, H', that the readings of the thermometers T, T', are maintained the same. The gage-glasses G, G', may be graduated to read in volumes, whereby the exact volume of the gases discharged from the reservoirs C, C' may be read from the gage-glasses. Then the ratio of the volumes so discharged at any given moment will be equal to the inverse ratio of the heat values of the two gases; or, if $v'$ represents the volume of the standard gas consumed, $v$ the value of the gas under test consumed and $h'$ the heat value of the standard gas, the heat value of the gas under test will be given by $$\frac{v''h'}{v}$$

The same principle may be employed for determining the heat value of a volatile liquid, such as gasolene. In this case a suitable burner is provided for the gasolene and another for the standard liquid, such as benzol or other chemically pure hydro-carbon. In this case each burner would show the weight of the volatile liquid consumed. Such a burner is shown in plan in Fig. 2 and in sectional elevation in Fig. 3. It consists of two principal parts, the base or reservoir 1 and the top or cap 2. The latter is screwed into the top of the reservoir 1 and is formed with a cavity 6 and nozzles or tips 4, 5, to which lead the passages 10, 11, respectively. These passages converge downwardly and meet in the passage 13 which communicates at its lower end through the hole 14 with the upper end of the passage 15 the lower end of which opens into the recess 16 which is formed in the bottom of the cap 2 and into which screws the upper end of the tube 7. The latter extends down into the chamber 9 to near the bottom 8 of the reservoir 1. The cap 2 is provided with a valve 3 the threaded stem 17 of which controls by its inner end the flow of the fuel through the hole or opening 14. The burner or lamp shown in Figs. 2 and 3 is of a size suitable for weighing; and each lamp and its contents are weighed before and after the test, whereby the amount of liquid fuel consumed during the test is ascertained. A preliminary heating is effected by burning in each cavity 6 a given weight of alcohol. By this heating the air in the chamber 9 is expanded and an air pressure sufficient to force the liquid fuel through the tube 7 and the passages 15, 14, 13, 11 and 10 to the nipples or tips 4, 5 is produced or generated. The valve 3 of each burner would be so manipulated as to maintain an equal temperature in both the water-heaters, M, M', as indicated by the thermometers T, T'. Then at any given instant, the ratio of the weights consumed, of the standard liquid and liquid under test, would be equal to the inverse ratio of the heat values of the two liquids. As before, the heat value of the standard liquid would be obtained from standard works of reference.

Each of the water-heaters M, M', may be provided with a gage-glass G''. The gage-glasses G'' are each marked with an index mark; and when these index marks are brought upon the same level or horizontal line, by means of the leveling screws M'' the operator is assured that the heaters M, M', contain equal volumes of water, the level of the water being then at the common level of the index marks.

I claim:

1. A calorimeter consisting of the combination of a pair of liquid-containing heaters provided with means for insuring that the liquid contents of the said heaters shall be equal; a pair of burners, one for each of said heaters; and devices for determining the change in temperature of the liquid contents of said heaters.

2. A calorimeter consisting of the combination of a pair of liquid-containing heaters; a device for filling said heaters, the latter being provided with means for insuring that the liquid contents of said heaters shall be equal; a pair of burners, one for each of said heaters; and devices for determining the change in temperature of the liquid contents of said heaters.

3. A calorimeter consisting of the combination of a pair of liquid-containing heaters; a liquid-containing vessel connected with said heaters to fill the same; means connecting said vessel and heaters; a pair of burners, one for each of said heaters; and devices for determining the change in temperature of the liquid contents of said heaters.

4. A calorimeter consisting of the combination of a pair of liquid-containing heaters; a liquid-containing device which communicates with said heaters; means which connect said device with said heaters means for opening and closing communication between said device and said heaters; a pair of burners, one for each of said heaters; and means for determining the change in temperature of the liquid contents of said heaters.

5. In a calorimeter, the combination with a pair of heaters having like diameters, of means for adjusting one of said heaters relatively to the other to compensate for variation in size.

6. In a calorimeter, the combination of a support; a pair of similar heaters supported thereby; and means interposed between said support and one of said heaters for adjusting the last-named heater relatively to the other.

7. In a calorimeter, the combination of a support; a pair of similar heaters supported thereby; and means interposed between said support and one of said heaters for raising and lowering the last-named heater relatively to the other.

8. In a calorimeter, the combination of a support; a pair of similar heaters supported thereby; means connected with both said heaters for bringing the contents thereof to the same level; and means interposed between said support and one of said heaters for raising and lowering the last-named heater to make the contents of said heaters accurately the same in weight.

9. A calorimeter consisting of the combination of a pair of reservoirs provided with burner outlets; means for maintaining the contents of said reservoirs at the same temperature; means for maintaining the contents of said reservoirs at the same pressure; means for determining the amount of the contents of each of said reservoirs which has escaped therefrom during the test; a pair of heaters separate from each other, one being placed close to each of said burner outlets; and means for determining the change in temperature of the contents of said heaters.

10. A calorimeter consisting of the combination of a pair of reservoirs provided with burner outlets; means for maintaining the contents of said reservoirs at the same pressure; a pair of heaters separate from each other, one being placed close to each of said burner outlets; and means for determining the change in temperature of the contents of said heaters.

11. A calorimeter consisting of the combination of a pair of reservoirs provided with burner outlets; means for maintaining the contents of said reservoirs at the same temperature; a pair of heaters separate from each other, one being placed close to each of said burner outlets; and means for determining the change in temperature of the contents of said heaters.

12. A calorimeter consisting of the combination of a pair of reservoirs provided with burner outlets; means for maintaining the contents of said reservoirs at the same temperature; means for maintaining said contents at the same pressure; a pair of heaters separate from each other, one being placed close to each of said burner outlets; and means for determining the change in temperature of the contents of said heaters.

13. In a calorimeter, the combination of a tank; a pair of reservoirs mounted therein and provided with burner outlets; a pair of heaters separate from each other, one being placed near each of said burner outlets; and means for determining the change in temperature of the contents of said heaters.

In witness whereof I have hereunto set my hand in the presence of the two undersigned witnesses at said Urbana this 26th day of March, 1908.

SAMUEL W. PARR.

Witnesses:
F. H. BARTON,
J. L. HANMORE.